United States Patent [19]

Barnette et al.

[11] 4,183,060
[45] Jan. 8, 1980

[54] CAPACITANCE DISTANCE SENSOR APPARATUS FOR VIDEO DISC PLAYER/RECORDER

[75] Inventors: William E. Barnette, Levittown, Pa.; Fred W. Spong, Lawrenceville, N.J.

[73] Assignee: RCA Corporation, New York, N.Y.

[21] Appl. No.: 942,183

[22] Filed: Sep. 14, 1978

Related U.S. Application Data

[63] Continuation of Ser. No. 777,476, Mar. 14, 1977, abandoned.

[30] Foreign Application Priority Data

Mar. 19, 1976 [GB] United Kingdom ............... 11122/76

[51] Int. Cl.² ...................... H04N 5/76; G11B 21/20; G11B 17/32
[52] U.S. Cl. ........................... 358/128; 179/100.3 V; 318/662; 361/280; 324/61 QS
[58] Field of Search ............... 358/128; 179/100.3 V, 179/100.41 G, 100.1 B, 100.4 M; 318/662; 361/280; 324/61 R, 61 QS

[56] References Cited

U.S. PATENT DOCUMENTS

| 3,198,880 | 8/1965 | Toulon | 179/100.3 V |
| 3,515,987 | 6/1970 | Zurbrick | 361/280 |
| 3,706,919 | 12/1972 | Abbe | 361/280 |
| 3,783,196 | 1/1974 | Stanley | 179/100.4 M |
| 3,806,668 | 4/1974 | Hilliker | 179/100.4 M |
| 3,825,323 | 7/1974 | Londwer | 179/100.3 V |
| 3,873,763 | 3/1975 | Jonssen | 179/100.3 V |

FOREIGN PATENT DOCUMENTS

| 2407065 | 8/1975 | Fed. Rep. of Germany | 358/128 |
| 1093816 | 12/1967 | United Kingdom | 358/128 |
| 1303124 | 1/1973 | United Kingdom | 358/128 |

Primary Examiner—Bernard Konick
Assistant Examiner—Alan Faber
Attorney, Agent, or Firm—E. M. Whitacre; J. S. Tripoli; J. E. Roehling

[57] ABSTRACT

A non-contact type, capacitance distance sensing probe having one or two electrodes disposed about one end of an objective lens system in an optical video disc system is used with a focus control servo loop to maintain focus of a light beam on the surface of a reflective disc record despite undesirable axial displacements of the surface when the record is rotated. The two electrode probe is balanced to provide immunity to variations in the impedance of the external circuit which grounds the disc.

6 Claims, 10 Drawing Figures

CAPACITANCE DISTANCE SENSOR APPARATUS FOR VIDEO DISC PLAYER/RECORDER

This is a continuation of application Ser. No. 777,476, filed Mar. 14, 1977, now abandoned.

CROSS REFERENCE TO RELATED APPLICATIONS

This application is related to the following copending U.S. applications, Ser. No. 777,474, entitled "TRACK SERVO SYSTEM" by L. Hedlund, et al., and Ser. No. 777,477, entitled "COMPENSATION APPARATUS FOR A SERVO SYSTEM WITH PERIODIC COMMAND SIGNALS" by W. Barnette, et al., both of which were filed on Mar. 14, 1977.

BACKGROUND OF THE INVENTION

1. Field of the Invention

This invention relates to a distance sensor for a servo control system and particularly to a non-contact capacitance probe apparatus and an improved capacitance sensing circuit that, illustratively, may be employed in an optical playback and record system as a distance sensor for maintaining a lens system within a particular depth of focus.

2. Description of the Prior Art

In one illustrative process of measuring the distance between a capacitance probe and a varying object, such as a rotating disc record, the sensing probe that is made of an electrically conductive material is secured to a lens system such that an electrically conductive coating on the disc record and the probe form a capacitance element. This capacitance element is futhermore connected into an electronic circuit that converts the variations in capacitance values of the element into a control signal for controlling a position actuator that is used to position the lens system relative to a surface of the rotating disc. The electronic circuit includes, illustratively, a fixed frequency oscillator and an FM ratio detector wherein the capacitance element is coupled into the detector which has a natural frequency that depends on the value of the capacitance element. When the surface of the disc is at the desired distance from the lens system, the fixed frequency of the oscillator will correspond to the natural frequency of the ratio detector. However, when the fixed frequency of the oscillator does not correspond to the natural frequency of the detector, an error signal is produced that is used to control the position actuator.

In similar circuits using a sensor comprising a single electrode probe, difficulties have been encountered in providing an adequately well grounded disc. Any variation of impedance in the path which grounds the disc are manifested as spurious signals from the sensor.

There is a need for an improved capacitance sensor that is nearly linear over a relatively large range of distances including distances approaching zero.

There is a further need for capacitance sensor circuitry and probe geometry that is insensitive to variations in ground return inductance. More particularly, a sensor is needed that may be operated relatively free of interaction with a second independent sensor of similar design if two sensors are employed simultaneously for playing back or recording information on the same disc.

SUMMARY OF THE INVENTION

In accordance with the invention, a distance measuring apparatus is provided for use in a position servo system wherein a probe is maintained at a substantially fixed distance from a reference surface that may not be flat. The reference surface is formed of electrically conductive material forming a plate of at least one capacitor whose capacitance is determined by the probe distance to the reference surface. A capacitance distance sensing circuit is coupled to the capacitor, which, in response to variations in the capacitance values as the probe distance may vary, generates a signal indicative of that distance. A reference signal corresponding to a fixed or mean distance of the probe is provided either by an adjustable reference voltage or a resonant circuit. The sensing circuit also includes a resonant circuit comprising the probe capacitance and an inductor. The resonant circuits are operated along the slope of the resonant frequency response curve defined by frequencies greater than the resonant frequency of the respective circuits. Tendency of the probe distance to change causes the sensing resonant circuit to generate a signal indicative of such change. This signal is compared to the reference signal to provide a control signal in the servo loop to energize a positioning device attached to the probe to inhibit change of probe position.

The probe is preferably formed in a dual electrode form and coupled in the sensing resonant circuit so that the capacitance developed by the probe is balanced with respect to the disc to render the circuit substantially insensitive to variations of potential of the disc.

DETAILED DESCRIPTION OF THE PREFERRED EMBODIMENTS

Figure 1:
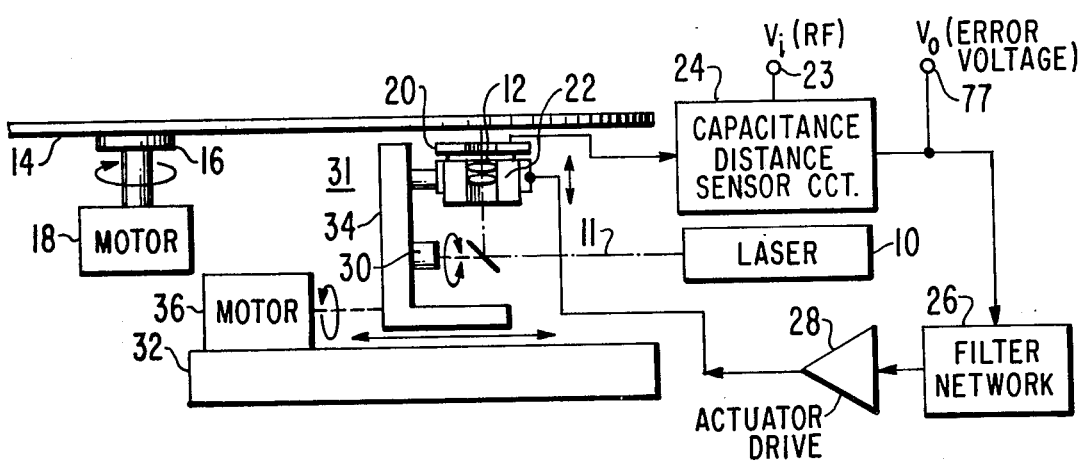
FIG. 1 is a schematic of a focusing servo in a disc recorder and playback system utilizing the distance sensor of the present invention.

A beam of coherent light 11 as shown in FIG. 1 from laser 10 is directed onto a galvanometer controlled mirror 30 along a path that is displaced but is substantially parallel to a surface of rotating disc 14. Disc 14 in the preferred form is provided with a metallic layer to serve as a plate of a capacitor. However, the invention may be practiced with a disc that is not provided with a metallic surface. A housing portion of mirror 30 is fixedly mounted at one end to a carriage 34 of a transporting means that is commonly referred to as stage 31. The light beam 11 impinges upon a conventional pivotal mirror 30 at an angle of incidence that causes the light beam to reflect towards the reflective surface of record 14 in a path perpendicular to the incident beam path.

This reflected light beam passes through a cavity within the center region of position actuator 22 and enters lens system 12. Lens system 12 is a conventional objective lens system that is provided with a suitable housing. Position actuator 22, a well known voice-coil type actuator, is used in this apparatus to move the position of lens 12 in directions perpendicular to the surface of disc 14. Lens 12 is mounted in the movable part of actuator 22, specifically, spring mounted to the body of actuator 22, which in turn is adjustably mounted to carriage 34 in a manner permitting manual adjustment of the mean lens distance from the surface of disc 14. Actuator 22 is interposed between mirror 30 and disc 14. The light that enters lens 12 emerges from lens 12 and is focused on the surface of disc 14.

Capacitance probe 20, which is fixedly attached to the outer perimeter of lens 12 at the end nearest to the surface of disc 14 and the metallic surface portions of disc 14 form an element of electrical capacitance. Varying values of capacitance are generated by this capacitance element in response to changing axial displacements that may occur as disc 14 rotates over probe 20. Disc 14 is preferably coated with a suitable material comprising a metal to make the surface reflective.

Disc 14, fixedly mounted to a small circular turntable 16, is rotated by turntable motor 18 at a high rate of speed. Due to unevenness and warpage, the disc 14 may exhibit an axial displacement called "runout" that occurs as disc 14 is rotated.

To obtain an error voltage for controlling actuator 22 so that lens 12 can be kept at a substantially fixed distance from disc 14, a capacitance distance sensor circuit 24 coupled to probe 20 in a resonant circuit is utilized. Preferred forms of circuit 24 will be described in detail with reference to FIGS. 3, 6, and 7.

In general, a source of RF voltage at a fixed frequency is coupled into circuit 24 through terminal 23 to energize one or more resonant circuits. One of the resonant circuits called herein a "dummy" circuit may be utilized in circuit 24, as a reference resonant circuit having an adjustable capacitance 76. The rectified output voltage from this reference resonant circuit has a polarity opposite to that of the resonant circuit comprising probe 20. The two output voltages, one from the probe circuit and the other from the dummy circuit, are summed in a summing network, also included in circuit 24, for developing an error voltage. This error voltage, which is indicative of the displacement of the probe from a position at a fixed distance from the surface of disc 14, is generated at the output terminal 77 ($V_0$) of capacitance distance sensor circuit 24. This error voltage is utilized in a feedback loop comprising filter network 26 and actuator drive amplifier 28 for controlling actuator 22 so that lens 12 is maintained at a desired fixed distance from the surface of rotating disc 14.

The error voltage is coupled from circuit 24 to filter network 26. Network 26 may be a comb filter comprising a plurality of narrow bandwidth filters tuned to different frequencies substantially corresponding to the rotational frequency and harmonics thereof of disc 14. A detailed description of such a comb filter is disclosed in the aforementioned. U.S. application of W. E. Barnette, et al., entitled "Compensation Apparatus for a Servo System With Periodic Command Signals." Network 26 may also be a broad bandwidth filter in accordance with conventional servo design.

The output of filter network 26 is coupled to a suitable actuator drive amplifier 28 that is, in turn, utilized to provide amplification of the filtered error signal to a level suitable for driving actuator 22. Typically, the precise distance between lens 12 and disc 14 must be maintained within a depth of focus tolerance of ±0.25 microns (micrometers) in spite of variations from flatness in the surface of the disc 14 that can cause axial runouts of, illustratively, 75 microns peak-to-peak. These conditions indicate that the gain for this loop should be at least 300. As known in the art, the loop gain required at any frequency is substantially equal to the amplitude of the Fourier component of the runout at that frequency divided by the depth of focus tolerance. In either the playback or record modes of operation, lens 12 is maintained within a particular depth of focus by the actuator 22 in response to the error voltage derived by the capacitance distance sensor circuit 24 as disc 14 is rotated relative to probe 20.

In order to record or playback at different radii of disc 14, lens 12 must be moved radially under rotating disc 14. To effect movement of lens 12 while maintaining alignment with beam path 11, a surface of actuator 22 and a mounting surface of galvanometer controlled mirror 30 are both rigidly mounted to carriage 34 of stage 31. Carriage 34 is slidably mounted to base 32 of stage 31. Carriage 34 is moved in a direction generally parallel to the surface of disc 14, by stage drive motor 36 that is fixedly mounted to base 32 and is controlled by suitable controlling apparatus, not shown. A detailed description of stage 31 and its operation may be found in the aforementioned. U.S. application, for L. Hedlund, et al. entitled "Track Servo System."

Probe 20 may be formed of either a single electrode or a pair of electrodes. However, because of specific environmental factors associated with the playback and record system of this invention, as will be explained, the electrode pair probe is preferred. To illustrate the structural features of the single and dual electrode probes, reference is now made to FIGS. 2a, 2b, 2c, and 2d.

Figure 2A:
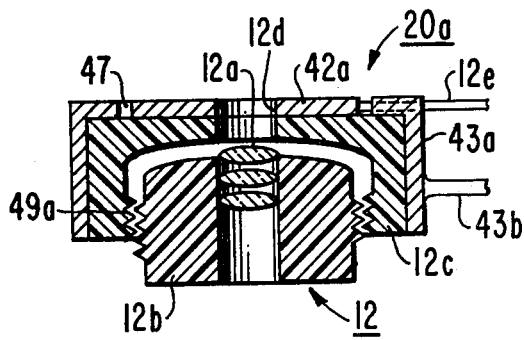
FIGS. 2a and 2b are elevation and plan view schematics respectively of a single-electrode capacitance probe of the invention.
Figure 2C:
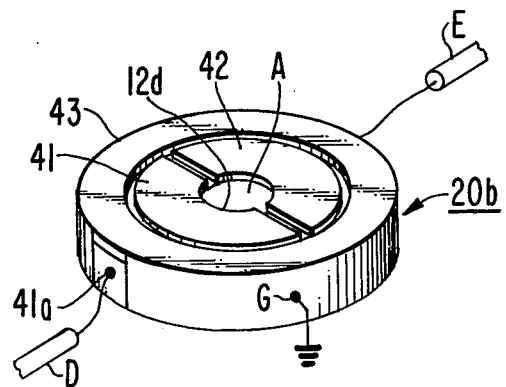
FIGS. 2c and 2d are perspective views of a dual electrode probe of the invention, FIG. 2d being partly in section.
Figure 2B:
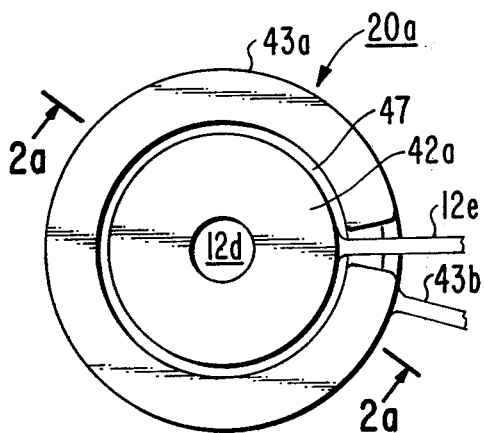

In FIGS. 2a and 2b, a side view of a single electrode capacitance probe apparatus 20a that is supportedly mounted to lens system 12 is illustrated. Lens system 12, comprises lens elements 12a of an objective lens system that has been fixedly installed in a suitable lens housing 12b. Housing 12b is coupled, in threaded engagement, as at 49a, to an insulated support structure 12c, formed, preferably of an epoxy compound. A single electrode 42a illustratively of a circular configuration (as best viewed in FIG. 2b), having a central aperture 12d for allowing light to pass through lens 12a and a terminal 12e for connecting the electrode into the resonant circuit 24 is securely affixed to a top surface of structure 12c. Mounted to a portion of the remaining top surface as well as the sides of structure 12c is a guard ring 43a. Ring 45a is spaced on the top surface of structure 12c, a desired distance from electrode 42a defining an insulating air gap 47 so as to form a nearly concentric shield around the region where probe 42a is located. A terminal 43b connects ring 43a to the system ground. Connecting terminal 12e extends outward from the circular electrode 42a and through an insulated gap in guard ring 43a.

FIG. 2c is a view in perspective of the dual electrode capacitance probe 20. Two semi-annular electrodes 41 and 42 are fixedly mounted on an insulated support structure 12c shown in section of FIG. 2d so as to surround aperture 12d through which light may pass. Ground guard ring 43 surrounds electrodes 41 and 42 providing a ground shield for preventing extraneous capacitive or inductive coupling between the electrodes and adjacent metal structures. Connections from the capacitance sensing circuit 24 of FIG. 1 to electrodes 41 and 42 are made through insulated terminals 41a and 42b, respectively.

Figure 2D:
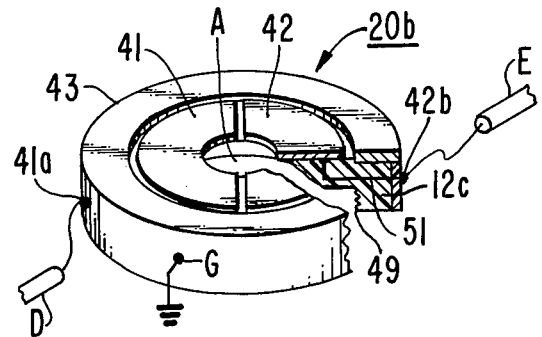

FIG. 2d shows the threaded portion 49 of the support structure coupled to a corresponding threaded portion of the lens 12 as depicted in FIG. 2a. As shown in FIG. 2d an electrical conductor 51 connects electrode 42 to the terminal 42b and a similar conductor connects terminal 41a to electrode 41. Terminal wires D and E connected to terminals 41a and 42b connect electrodes 41 and 42, respectively, of probe 20 to distance sensor circuit 24.

Figure 3:
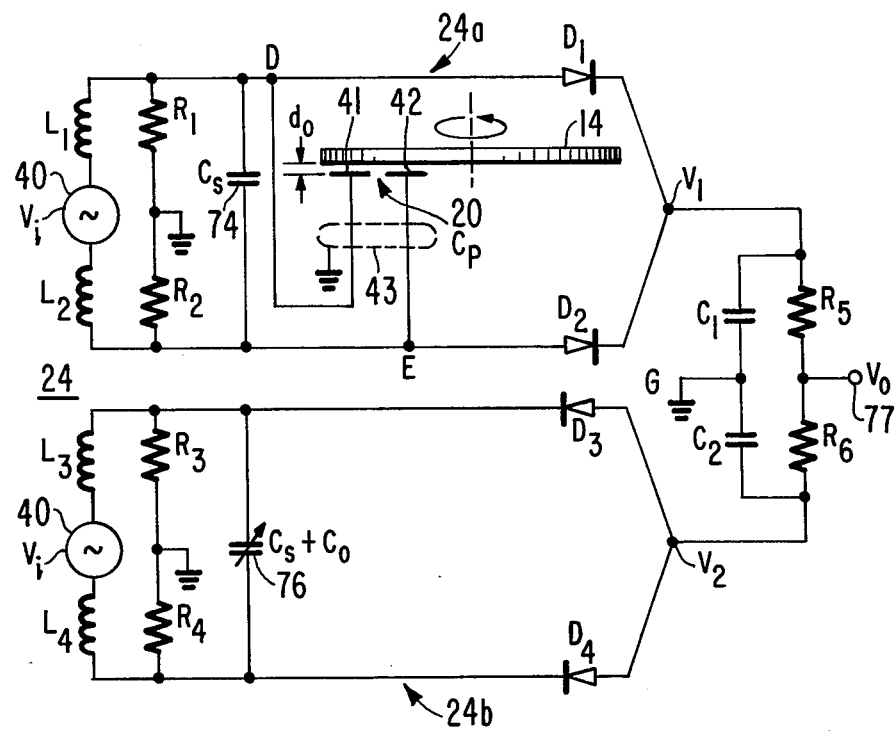
FIG. 3 is an equivalent circuit model of a sensor circuit utilizing a dual electrode probe.

Reference is now directed to FIG. 3 that is a diagram of an equivalent circuit of the capacitance sensing circuit 24 utilizing the preferred dual electrode probe wherein the electrodes and the associated circuit components are in a balanced configuration. FIG. 3 will serve as a model for what may be regarded as a transfer function of output voltage, termed herein the error voltage, to probe displacement, as will be explained. Circuit 24 comprises a sensing circuit 24a that includes the capacitance probe 20 in a first resonant circuit and a dummy circuit 24b including an adjustable capacitor in a second resonant circuit. In brief, circuit 24b operates to provide a reference output voltage $V_2$ that is summed with an oppositely polarized output voltage $V_1$ of circuit 24a to derive an error voltage ($V_0$) at terminal 77 that is indicative of the displacement of the probe 20 from a position at a fixed predetermined distance from the disc 14.

The effective capacitance of probe 20 varies inversely with probe distance and is represented by capacitance $C_p$ according to the relationship:

$$C_p = C_0/(1 + \delta/d_0) \qquad (1)$$

where $C_0$ is the probe capacitance value at a mean position at a distance $d_0$ from the metallic surface of disc 14, and $\delta$ is an incremental distance of probe 20 measured from the distance $d_0$.

Sensing circuit 24 comprises two resonance circuits energized by an RF oscillator of substantially fixed frequency 40. Inductances $L_1$ and $L_2$, resistors $R_1$ and $R_2$, are connected with a fixed capacitor $C_s$ and probe capacitor $C_p$ to form the first resonant circuit of the sensing circuit 24a. It should be noted that electrodes 41 and 42 of probe 20 form the equivalent capacitor $C_p$ as two capacitors in series, the common plate of which being the conductive surface of disc 14. Since the electrodes 41 and 42 are symmetrically disposed above and below ground potential, the potential of the disc 14 remains essentially neutral. Thus no ground currents will be excited by this balanced sensing circuit in the other regions of the disc 14 providing, of course, the balance is perfect.

Inductances $L_3$ and $L_4$, resistors $R_3$ and $R_4$, are connected with an adjustable capacitor 76 adjustable to provide a capacitance value equal to the sum of the capacitance of the fixed capacitor $C_s$ and the capacitance $C_0$ to form the second resonant circuit of the dummy circuit 24b. Both resonant circuits are coupled to a common RF oscillator 40.

The Q for both resonant circuits is:

$$Q = R/\omega_0 L \qquad (2)$$

where R is equal to $(R_1+R_2)$ or $(R_3+R_4)$, L is $(L_1+L_2)$ or $(L_3+L_4)$ and $\omega_0$ is the angular resonant frequency:

$$\omega_0 = 1/\sqrt{L(C_s+C_0)} \qquad (3)$$

The polarity of diodes $D_1$ and $D_2$ of circuit 24a are opposite to that of diodes $D_3$ and $D_4$ of circuit 24b. These diodes rectify the RF voltage of the resonant circuits. The polarity of the rectified voltage from sensing circuit 24a is opposite to that of the rectified voltage from dummy circuit 24b. These output voltages ($V_1$, $V_2$) are applied to a summing network comprising resistor $R_5$ and $R_6$. These voltages are summed at summation point 77 located at the junction of resistors $R_5$ and $R_6$ providing an output "error" voltage $V_0$ proportional to the sum of $V_1$ and $V_2$. Capacitors $C_1$ and $C_2$ serving as low pass filters remove most of the remaining RF signal from the rectified voltages.

In operation, both resonant circuits are energized on the high frequency side of resonance. If the capacitance 76 is equal to the sum of capacitance 74 and $C_p$, the resonant circuits 24a and 24b will be in balance causing the error signal $V_0$ to be zero. As the capacitance $C_p$ changes, as by relative movement of the probe 20 and the disc 14, the output voltage $V_1$ will change causing the error voltage $V_0$ to change accordingly.

The transfer function of the sensor, i.e., the functional relationship between the output voltage ($V_0$) and the probe-to-disc distance can be derived on the basis of the equivalent circuit model of FIG. 3. The dimensionless output signal $S = (V_0/V_i)$ can be shown to be:

$$S = \cfrac{1}{\sqrt{\left[1 - n^2 \cfrac{(1 + \frac{K}{1+x})}{1+K}\right]^2 + \cfrac{n^2}{Q^2}}} - \cfrac{1}{\sqrt{(1-n^2)^2 + n^2/Q^2}} \qquad (4)$$

where $\eta = (\omega/\omega_0)$, $\omega$ being the RF oscillator (40) frequency and $\omega_0$ being the resonant frequency of the circuit defined above; $K = (C_0/C_s)$; $x = (\delta/d_0)$ and $Q = R/\omega_0 L$; $V_0$ is the output voltage, $V_i$ is the input RF voltage (oscillator 40), $C_0$, $C_s$ and $\delta$ being that as defined above.

Equation (4) can be regarded as a transfer function relating the normalized position variable x with normalized output voltage S. The other parameters of the model circuit (FIG. 3), the normalized frequency $\eta$ capacitance ratio K, and quality factor Q can be suitably chosen within limits, to optimize the transfer function of the sensor with respect to sensitivity, linearity, and range.

Figure 4:
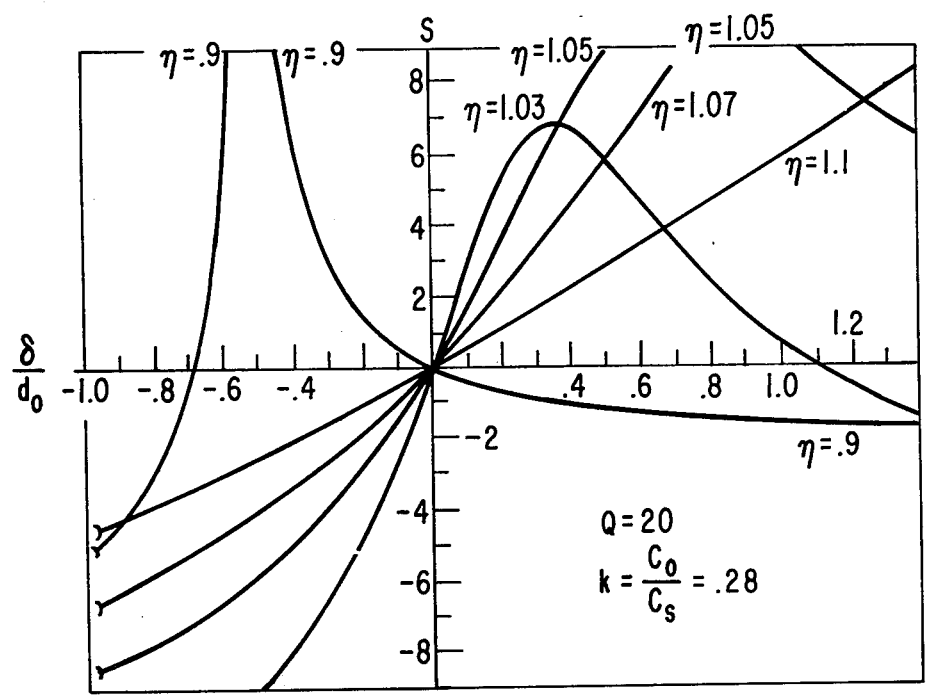
FIGS. 4 and 5 are curve plots of the transfer function characteristic of the sensor.

Reference is now made to FIG. 4. Plots of the transfer function S for certain illustrative values of parameters (not necessarily optimum) are shown, namely, $Q = 20$, $C_0/C_s = 0.28$ and various values of normalized oscillator frequency $\eta = \omega/\omega_0$. These curves serve to illustrate the importance of operating on the high frequency slope of the resonance curve. A comparison of the behavior of curve $\eta = 1.1$ with curve $\omega = 0.9$, these curves for the oscillator frequency 10% above and below resonance, respectively, reveal much greater linearity of the high frequencey curve $\eta = 1.1$. Also these curves reveal that greater sensitivity, i.e, the slope of the curves near $\delta = 0$, can be obtained at frequencies nearer (but not at) resonance (i.e., $\eta = 1.07$, 1.05, 1.03)

but note that increasing sensitivity can reduce linearity and range in the trade-off of these characteristics. Observe that the high frequency curves ($\eta > 1$) approach zero probe distance ($\delta/d_0 \rightarrow -1$) in a well behaved, quasi-linear manner, in contrast to the low frequency curves ($\eta < 1$) which exhibits a resonant behavior for $\delta/d_0$ between zero and minus one.

Figure 5:
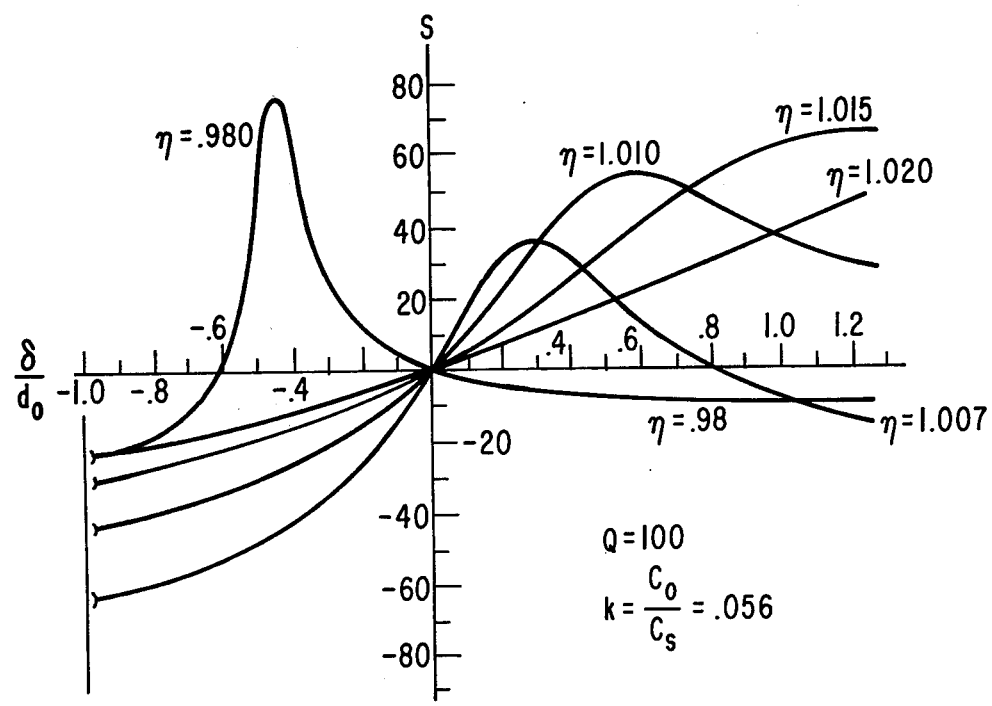

Reference is now made to FIG. 5. Plots of higher values of Q are illustrated that yield good linearity and range along with improved sensitivity over the lower Q values of FIG. 4. To better realize this characteristic observe the scale change by a factor of ten of the ordinates for the plots relative to the ordinate scale (S) of FIG. 4. To achieve these characteristics along with a suitable high Q circuit, a smaller probe capacitance to fixed capacitance ratio $K = C_0 C_s$ is used. It should be understood, however, that there are practical limits to the sensitivity that can be obtained with extremely high Q values due to limited stability and tolerances of real circuit components.

Figure 6:
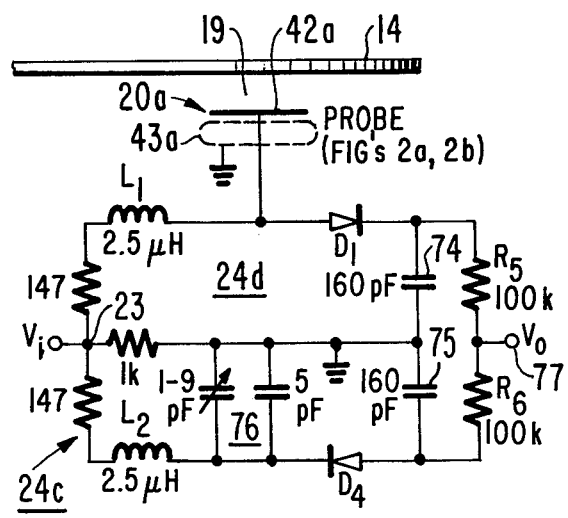
FIG. 6 is a circuit embodiment utilizing a single electrode sensor.
Figure 7:
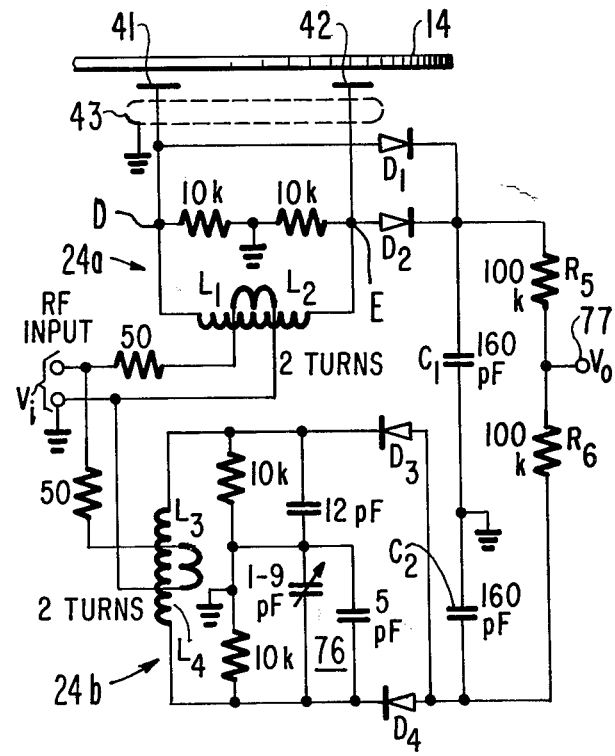
FIG. 7 is a circuit embodiment utilizing a dual electrode sensor.

Reference is now made to FIGS. 6 and 7 showing detailed schematics of circuits embodying the present invention. Certain components of the circuits are identified with reference numerals and letters corresponding to the model circuit FIG. 3 to the extent they are common or perform the same function.

Referring first to FIG. 6, the circuit shown therein is designed to operate with a single electrode probe such as illustrated by FIGS. 2a and 2b described above. The sensing resonant circuit 24d is provided with a coil $L_1$ resonating with a single electrode probe capacitor 20a. The stray capacitance of the circuit is not shown. The dummy resonant circuit 24c comprises inductor $L_2$ and the capacitor combination 76 comprising a 1–9 picofarad adjustable capacitor. Each series resonant circuit has a measured Q of about 8. The resonant frequency is about 25 MHz and the operating frequency was set at about 27 MHz, that is, two megahertz above resonance. The probe is about 2 cm. in diameter and 250 micrometers from disc 14. The two oppositely polarized diodes, $D_1$ and $D_4$ rectify the RF signals. Most of the RF signal is filtered from the detected signals by the 160 picofarad capacitors (pf) 74 and 75. The detected outputs, which are of opposite sign, are then summed at the junction of the two 100K resistors $R_5$ and $R_6$. If the two tuned circuits are identical, the summation point of the 100K resistors namely, terminal 77, will be zero DC volts with reference to ground when the total capacitance of the adjustable capacitors 76 is made equal to the mean probe capacitance 19. The detected output from the probe series resonant circuit 24d will vary as the axial disc runout causes the probe capacitance to ground 19 through the disc 14 to vary. The voltage signal produced at terminal 77 represents the axial disc runout and is an output error voltage comparable to $V_0$ described with respect to FIG. 3.

One of the problems encountered in using the circuit of FIG. 6 is providing a well defined RF ground for the disc 14. At 27 MHz, for example, any variations in the RF ground return inducance are manifested as apparent changes in probe capacitance. Such problems can be avoided by use of the balanced capacitance probe arrangement of FIG. 7, now to be described.

Reference is now made to the detailed diagram illustrated in FIG. 7 which is a circuit for a balanced probe, that is, a probe that is formed of two electrodes as illustrated in FIGS. 2c and 2d. As explained above, the single probe electrode is essentially symmetrically divided so that the circuit measures the effective capacitance between circuit points D and E. The circuit is balanced in that capacitor currents through disc 14 are confined to the region of the disc in the vicinity of probe 20. Thus, this arrangement renders the circuit relatively immune to imperfect grounding of the disc 14. Furthermore, this arrangement renders the circuit immune to the effects of a second probe operating simultaneously at another position of the disc.

The circuit consists of two resonant circuits 24a and 24b transformer coupled to the RF input ($V_i$) by coils loosely coupled, respectively to coils $L_1$, $L_2$, and $L_3$, $L_4$. The remote ends of the resonant circuit coils are kept balanced with respect to ground by the grounded center tap of the 10K resistors shunting the respective coils. A virtual center tap is thus formed for each resonant coil by the 10K resistors corresponding to $R_1$, $R_2$, $R_3$, and $R_4$ of FIG. 3. It should be noted that the capacitor $C_s$ shown in FIG. 3 is representative of the stray capacitances existing between points D and E. Such a stray capacitance is not shown in FIGS. 6 and 7 but understood to be present. Nevertheless for higher Q circuits, it may be necessary to provide a real capacitor. The circuit of FIG. 7 has a Q of about 12. The diodes produce full wave rectification of the RF signals of the resonant circuits. When the dummy circuit (24b) balancing capacitance 76 is adjusted to be equal to the probe circuit capacitance, the voltage appearing at the summation point 77 will be zero.

Both the unbalanced (FIG. 6) and balanced (FIG. 7) probe circuits are followed by suitable operational amplifiers, not shown, to provide desired voltage gain and impedance transformation to drive the circuits following in the servo loop illustrated in FIG. 1.

While the embodiments of the invention described provide for both a sensing resonant circuit and a dummy resonant circuit, it should be understood that under certain operating conditions, a dummy resonant circuit may not be necessary. This might be the case, for example, when the invention is used in an environment wherein the temperature of the components is substantially constant. In such a case, the resonant circuit 24b illustrated in FIG. 3 can be eliminated, the point $V_2$ being provided with a suitable reference voltage corresponding to the desired mean distance of the probe to the disc 14.

Furthermore, with respect to the form of the probe 20, various modifications in the form of the pair of electrodes may be made within the teachings of the invention. For example, the electrodes 41 and 42 may be in the form of concentric annuli, each annulus having the same area.

The invention thus provides a simple circuit for non-contact, capacitive sensing of rapidly changing position or distance. For suitably chosen circuit parameters, sensing is nearly linear over a range of distances from some given distance down to zero distance. To achieve this property, it is essential to operate a fixed frequency RF oscillator on the high frequency slope of a circuit having a resonant frequency response as described above. Further, the balanced probe and sensing circuit minimizes errors due to ground return currents and reduces interaction between similar nearby sensors. The dummy circuit minimizes the effect of oscillator frequency drifts, drifts due to common thermal variations of the components, and also cancels the dc offset voltage from the sensing circuit. Furthermore, if the "dummy" circuit is used in a position servo application, variations in oscillator level affect only loop gain and not closed loop position.

What is claimed is:

1. An apparatus for use in an optical video disc playback and recording system for maintaining an objective lens relative to a surface of the disc at a desired distance; said apparatus comprising:

a probe having a first and second coplanar electrode, said probe being connected to a first end of said objective lens, said probe and said disc forming a capacitance element, the capacitance of said element being a function of the distance between said lens and said surface;

means coupled to each of said first and second electrodes of said probe for maintaining said first electrode at an rf potential that is equal in magnitude and opposite in polarity to the rf potential of said second electrode;

a first resonant circuit, having a net capacitance including said capacitance element, said first resonant circuit having a given resonant frequency, for providing an output voltage at a given polarity;

a second resonant circuit, having a net capacitance equal to the net capacitance of said first resonant circuit when the distance between said lens and said surface is at said desired distance, said second resonant circuit having said given resonant frequency for providing an output voltage at a fixed reference voltage level but of a polarity opposite to said given polarity;

a single source of rf signals coupled to said first and to said second resonant circuits for providing rf signals at a frequency above said given resonant frequency;

means for summing said first and second resonant circuit output voltage for providing an error signal, said error signal being at a null when the distance between said lens and said surface is at said desired distance; and actuating means coupled to said lens and responsive to said summing means error signal for axially positioning said lens relative to said disc.

2. The apparatus according to claim 1 wherein said probe electrodes are two semi-annuli.

3. The apparatus according to claim 1 wherein said probe electrodes are concentric rings, the respective areas of each being substantially equal.

4. An apparatus for use in an optical video disc playback and recording system for maintaining an objective lens relative to a surface of the disc at a desired distance; said apparatus comprising:

a probe having a first and second coplanar electrode, said probe being connected to a first end of said objective lens, said probe and said disc forming a capacitance element, the capacitance of said element being a function of the distance between said lens and said surface;

means coupled to each of said first and second electrodes of said probe for maintaining said first electrode at an rf potential that is equal in magnitude and opposite in polarity to the rf potential of said second electrode;

a first resonant circuit means having a net capacitance including said capacitance element, said first resonant circuit means having a given resonant frequency and at least one diode for providing an output voltage at a given polarity;

a second resonant circuit means having a variable capacitor adjusted such that the net capacitance of said second resonant circuit means is equal to the net capacitance of said first resonant circuit means when the distance between said lens and said surface is at said desired distance, said second resonant circuit means having said given resonant frequency and at least one diode poled opposite that of said first resonant circuit means diode for providing an output voltage at a fixed reference voltage level but of a polarity opposite to said given polarity;

a single source of rf signals coupled to said first and to said second resonant circuit means for providing rf signals at a frequency above said given frequency;

resistive summing means connected between said first and said second resonant circuit means for providing at an output terminal thereof an error signal, said error signal being at a null when said distance between said lens and said surface is at said desired level; and means, coupled to said probe, for establishing relative motion between said disc and said lens in response to said error signal when the distance between said lens and said surface is not at said desired distance.

5. The apparatus according to claim 4 wherein said probe electrodes are two semi-annuli.

6. The apparatus according to claim 4 wherein said probe electrodes are concentric rings, the respective areas of each being substantially equal.

* * * * *